United States Patent
Yoshida et al.

(10) Patent No.: US 10,508,169 B2
(45) Date of Patent: Dec. 17, 2019

(54) CURABLE RESIN AND PRODUCING PROCESS THEREFOR

(71) Applicant: NIPPON SHOKUBAI CO., LTD., Osaka (JP)

(72) Inventors: Masatoshi Yoshida, Osaka (JP); Nobuaki Otsuki, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 170 days.

(21) Appl. No.: 15/002,658

(22) Filed: Jan. 21, 2016

(65) Prior Publication Data

US 2016/0222154 A1  Aug. 4, 2016

(30) Foreign Application Priority Data

Feb. 2, 2015 (JP) ................................. 2015-018461

(51) Int. Cl.
  C08G 59/14 (2006.01)
  C08G 59/17 (2006.01)
  C08G 59/16 (2006.01)
(52) U.S. Cl.
  CPC ..... *C08G 59/1494* (2013.01); *C08G 59/1438* (2013.01); *C08G 59/1455* (2013.01); *C08G 59/1466* (2013.01)
(58) Field of Classification Search
  None
  See application file for complete search history.

(56) References Cited

U.S. PATENT DOCUMENTS

| | | | |
|---|---|---|---|
| 4,593,078 A | 6/1986 | Kooymans et al. | |
| 4,614,775 A | 9/1986 | Bekooij et al. | |
| 4,686,248 A | 8/1987 | Bekooij et al. | |
| 4,738,995 A | 4/1988 | Kooijmans et al. | |
| 4,925,773 A | 5/1990 | Miyamura et al. | |
| 4,937,275 A | 6/1990 | Kooijmans et al. | |
| 5,009,982 A | 4/1991 | Kamayachi et al. | |
| 6,077,879 A | 6/2000 | Ohtsuki et al. | |
| 2004/0009428 A1* | 1/2004 | Tamura | G03F 7/0047 430/280.1 |
| 2006/0079609 A1* | 4/2006 | Nishioka | C08J 5/18 523/400 |
| 2008/0039585 A1* | 2/2008 | Nishioka | C08L 9/06 525/187 |
| 2008/0096133 A1* | 4/2008 | Kato | C08F 283/10 430/286.1 |
| 2008/0308301 A1* | 12/2008 | Itoh | C08F 2/50 174/250 |
| 2009/0038834 A1* | 2/2009 | Itoh | C08F 283/00 174/258 |
| 2009/0194319 A1* | 8/2009 | Itoh | G03F 7/031 174/250 |
| 2010/0243304 A1* | 9/2010 | Otsuki | C08G 59/1466 174/258 |
| 2011/0245363 A1* | 10/2011 | Choi | C08G 59/4021 522/64 |
| 2012/0308838 A1 | 12/2012 | Ito et al. | |
| 2014/0147776 A1* | 5/2014 | Ito | G03F 7/038 430/18 |

FOREIGN PATENT DOCUMENTS

| | | |
|---|---|---|
| DE | 37 04 149 | 8/1988 |
| EP | 0 273 729 | 7/1988 |
| EP | 0 127 915 | 12/1988 |
| JP | 61-243869 | 10/1986 |
| JP | 63-258975 | 10/1988 |
| JP | 6-192387 | 7/1994 |
| JP | 7-242716 | 9/1995 |
| JP | 11-222514 | 8/1999 |
| JP | 11-288091 | 10/1999 |
| JP | 11-315107 | 11/1999 |
| JP | 2000-109541 | 4/2000 |
| JP | 2003-280190 | 10/2003 |
| JP | 2004-37726 | 2/2004 |
| JP | 2004-61566 | 2/2004 |
| JP | 2004-171026 | 6/2004 |
| JP | 2007-199246 | 8/2007 |
| JP | 2011-164270 | 8/2011 |

OTHER PUBLICATIONS

English language machine translation of JP 2007-199246. Original Japanese document published Aug. 9, 2007. Translation done Sep. 4, 2018 (Year: 2018).*
"Epiclon Standard Products Epoxy Resin and Curing Agents", DIC Corporation. Mar. 2017 (Year: 2017).*
"Epoxy Resins Reactive Flame Retardant Hardeners", Thermosetting Resins, Nippon Kayaku 13th Edition. Mar. 3, 2016 (Year: 2016).*
Office Action dated Nov. 28, 2017 in Japanese Application No. 2016-006472, with English Translation.
Office Action dated Jun. 1, 2018 in Korean Application No. 10-2016-0010239, with English translation.
Office Action dated Aug. 23, 2018 in corresponding Chinese Application No. 201610055902.4, with English translation.
Office Action dated Jul. 3, 2018 in corresponding Japanese Application No. 2016-006472, with English translation.

(Continued)

*Primary Examiner* — Megan McCulley

(74) *Attorney, Agent, or Firm* — Wenderoth, Lind & Ponack, L.L.P.

(57) ABSTRACT

A curable resin obtained by reacting a polybasic anhydride with a reaction product of an epoxy resin with a phenol compound having an alcoholic hydroxyl group and an unsaturated monobasic acid, wherein an epoxy resin having a softening point of 93° C. or higher is used as the epoxy resin.

13 Claims, No Drawings

(56) References Cited

OTHER PUBLICATIONS

Taiwanese Office Action dated Feb. 15, 2019 in corresponding Taiwanese Application No. 105101655, with English translation.
Decision of Rejection dated Apr. 2, 2019 in corresponding Japanese Patent Application No. 2016-006472, with English translation.
Decision of Rejection dated Jun. 5, 2019 in corresponding Taiwanese Application No. 105101655, with English Translation.

* cited by examiner

CURABLE RESIN AND PRODUCING PROCESS THEREFOR

This application claims priority to Japanese Patent Application No. 2015-018461, filed on Feb. 2, 2015, and the entire contents of which are incorporated by reference herein.

BACKGROUND OF THE INVENTION

Field of the Invention

The present invention relates to a curable resin which can be used for image formation and the like, a producing process therefor, a curable resin composition containing the curable resin and cured products of them.

Description of the Related Art

Epoxy acrylate, which is produced by modifying an epoxy resin with an unsaturated monobasic acid, can be cured with heat or light, and since its chemical resistance is excellent, epoxy acrylate is used as a curable resin in applications such as various molding materials and coating materials. Epoxy acrylate is widely used as a photo-curable resin for image formation and fine processing, and in this industrial field, there is a demand for a resin to which a principle of photo-imaging can be applied as minuteness of the image, and also which can be developed in a diluted weak alkaline aqueous solution for an environmental protection. From these points of view, epoxy acrylate having a carboxyl group, which can be obtained by reacting epoxy acrylate with polybasic anhydride to introduce a carboxyl group, has been used (for example, Japanese Unexamined Laid-Open Patent Publications Nos. 61-243869, 63-258975, 11-222514 and 2000-109541).

In pattern formation using a photo-curable resin, the following process is employed: the curable resin is applied onto a substrate and dried by heating to form a coating layer, and then a patterning film is compressed onto it and the resultant is exposed to light to be developed. In this process, good developability and high resolution for forming a fine pattern or tack-free property of the curable resin, which is associated with peeling property of the patterning film after exposure and development, are required, and various studies has been conducted. In recent years, it is also required for a cured product, which is obtained by curing the curable resin, to have high durability, and further to have thermal shock resistance as heat resistance or environmental resistance to be capable of withstanding high temperature processes (e.g. soldering in a solder resist and ITO film forming in a color filter substrate), depending on the application of the cured product.

The present invention has been achieved in view of the above circumstances, and the object of the present invention is to provide a curable resin which gives a cured product having an excellent thermal shock resistance and a producing process therefor.

SUMMARY OF INVENTION

A curable resin of the present invention which solves the above problem is obtained by reacting a polybasic anhydride with a reaction product of an epoxy resin with a phenol compound having an alcoholic hydroxyl group and an unsaturated monobasic acid, wherein an epoxy resin having a softening point of 93° C. or higher is used as the epoxy resin. Since the curable resin of the present invention is a modified epoxy resin which a radically polymerizable double bond and a carboxyl group are introduced in, it has an alkaline developability and thermal or light curable property. And, by employing an epoxy resin having a softening point of 93° C. or higher as the epoxy resin, the resulting cured product is less likely to be cracked even when it is given a repeated heat history of high and low temperatures, and so, it is excellent in thermal cycle test resistance (TCT resistance), that is thermal shock resistance.

The present invention also provides a process for producing a curable resin comprising the steps of: reacting an epoxy resin having a softening point of 93° C. or higher with a phenol compound having an alcoholic hydroxyl group and an unsaturated monobasic acid to give a modified epoxy resin intermediate; and reacting a polybasic anhydride with a hydroxyl group of the modified epoxy resin intermediate. According to the producing process of the present invention, a curable resin which has an alkaline developability and thermal or light curable property and becomes excellent in thermal shock resistance can be obtained.

A cresol novolac epoxy resin is preferably used as the epoxy resin. By using a cresol novolac epoxy resin having a softening point of 93° C. or higher, heat resistance and thermal shock resistance of the obtained curable resin can be enhanced.

It is preferred that 0.15 moles or more and 0.5 moles or less of the phenol compound is reacted with 1 chemical equivalent of an epoxy group of the epoxy resin. When the phenol compound is reacted with the epoxy resin in such ratio, the curable resin tends to have good curability and flexibility of the resulting cured product can be increased.

It is preferred that 0.5 moles or more and 0.85 moles or less of the unsaturated monobasic acid is reacted with 1 chemical equivalent of the epoxy group of the epoxy resin. When the unsaturated monobasic acid is reacted with the epoxy resin in such ratio, the curable resin tends to have good curability and brittleness of the resulting cured product can be reduced.

It is preferred that 0.8 moles or more and 1.1 moles or less of the phenol compound and the unsaturated monobasic acid in total is reacted with 1 chemical equivalent of the epoxy group of the epoxy resin. When the phenol compound and the unsaturated monobasic acid are reacted with the epoxy resin in such ratio, the effect of introducing the phenol compound and the unsaturated monobasic acid into the epoxy resin tends to be sufficiently exerted, and preservation stability of the curable resin is improved.

It is preferred that 0.1 moles or more and 1.1 moles or less of the polybasic anhydride is reacted with 1 chemical equivalent of a hydroxyl group of the reaction product of the epoxy resin with the phenol compound having an alcoholic hydroxyl group and the unsaturated monobasic acid. By reacting the polybasic anhydride in this manner, the addition reaction of the polybasic anhydride can be conducted efficiently and the carboxyl group can be properly introduced into the obtained curable resin.

It is preferred that the curable resin has double bond equivalent of 480 g/eq. or more and 620 g/eq. or less. When the curable resin has such double bond equivalent, curability of the curable resin is improved and thermal properties and flexibility of the cured product are improved.

The present invention also provides a curable resin composition comprising the curable resin of the present invention and a polymerization initiator, and a cured product obtained by curing the curable resin of the present invention or the curable resin composition of the present invention. Since the cured product of the present invention is obtained by curing a modified epoxy resin formed from an epoxy resin having a softening point of 93° C. or higher, it has excellent thermal shock resistance.

As described above, since the curable resin of the present invention and the curable resin obtained by the producing process of the present invention are a modified epoxy resin which a radically polymerizable double bond and a carboxyl group are introduced in, it has an alkaline developability and thermal or light curable property. And, since an epoxy resin having a softening point of 93° C. or higher is used as the epoxy resin, the resulting cured product is less likely to be cracked even when it is given a repeated heat history of high and low temperatures, and so, it is excellent in thermal cycle test resistance (TCT resistance), that is thermal shock resistance.

DESCRIPTION OF THE PREFERRED EMBODIMENTS

A curable resin of the present invention is a radically polymerizable curable resin obtained by modifying an epoxy resin, and specifically obtained by reacting a polybasic anhydride with a reaction product of an epoxy resin reacted with both a phenol compound having an alcoholic hydroxyl group and an unsaturated monobasic acid. Since the curable resin of the present invention is a modified epoxy resin which a radically polymerizable double bond and a carboxyl group is introduced in, it has an alkaline developability and thermal or light curable property, and can be used as an alkaline developable curable resin for image formation or the like, for example. In the present specification, the reaction product of an epoxy resin with a phenol compound having an alcoholic hydroxyl group and an unsaturated monobasic acid may be referred to as "a modified epoxy resin intermediate".

The curable resin of the present invention can be obtained by a producing process comprising the steps of: reacting an epoxy resin having a softening point of 93° C. or higher with a phenol compound having an alcoholic hydroxyl group and an unsaturated monobasic acid to give a modified epoxy resin intermediate (a first reaction step); and reacting a polybasic anhydride with a hydroxyl group of the modified epoxy resin intermediate (a second reaction step). According to the producing process of the present invention, by reacting a phenol compound having an alcoholic hydroxyl group with the epoxy resin, an alcoholic hydroxyl group can be introduced into the curable resin, and further by reacting an unsaturated monobasic acid with the epoxy resin, a radically polymerizable double bond can be introduced into the curable resin. The thus obtained reaction product (the modified epoxy resin intermediate) is reacted with a polybasic anhydride, whereby a carboxyl group can be introduced into the curable resin. Thus, according to the producing process of the present invention, the curable resin, that a radically polymerizable double bond and a carboxyl group are introduced in the epoxy resin, can be obtained, and such curable resin comes to have an alkaline developability and thermal or light curable property.

In the present invention, an epoxy resin having a softening point of 93° C. or higher is used as the epoxy resin. The epoxy resin is not particularly limited, as long as it has two or more epoxy groups in a molecule, and conventionally-known epoxy resins can be used. Examples of the epoxy resin include: bisphenol epoxy resin; biphenyl epoxy resin; alicyclic epoxy resin; polyfunctional glycidyl amine resins such as tetraglycidyl aminodiphenyl methane; polyfunctional glycidyl ether resins such as tetraphenyl glycidylether ethane; phenol novolac epoxy resins and cresol novolac epoxy resins; a reaction product of epichlorohydrin with a polyphenol compound obtained by condensation reaction between a phenol compound such as phenol, o-cresol, m-cresol and naphthol and aromatic aldehyde having a phenolic hydroxyl group; a reaction product of epichlorohydrin with a polyphenol compound obtained by addition reaction between the phenol compound and a diolefin compound such as divinylbenzene and dicyclopentadiene; an epoxidized product of ring-opened polymer of 4-vinylcyclohexene-1-oxide with a peroxy acid; epoxy resins having a heterocyclic ring such as triglycidyl isocyanurate; and the like. In addition to the above, also usable as the epoxy resin may be a compound obtained by coupling two or more molecules of the above-described epoxy resins with each other by chain-extension reaction using a chain-extension agent such as polybasic acids, polyphenol compounds, polyfunctional amino compounds and polythiols.

As the epoxy resin, a cresol novolac epoxy resin is preferably used. In this case, a cresol novolac epoxy resin may be used as at least a part of the epoxy resin. By using a cresol novolac epoxy resin, heat resistance property of the obtained curable resin can be improved. As the cresol novolac epoxy resin, conventionally-known one can be used and it can be prepared by, for example, reacting cresol with epichlorohydrin.

As the epoxy resin, an epoxy resin having a softening point of 93° C. or higher is used. When the epoxy resin having a softening point of 93° C. or higher is used, the cured product, which is obtained by curing the curable resin, becomes excellent in developability and is less likely to be cracked even when it is given a repeated heat history of high and low temperatures, and so, it comes to be excellent in thermal cycle test resistance (TCT resistance), that is thermal shock resistance. The softening point of the epoxy resin is preferably 93.5° C. or higher, more preferably 94° C. or higher. In view of enhancing the thermal shock resistance, it is also preferable to use the epoxy resin having a softening point of 96° C. or higher. As the epoxy resin, it is preferred that a cresol novolac epoxy resin having a softening point of 93.5° C. or higher is used. Such cresol novolac epoxy resin has relatively high softening point among cresol novolac epoxy resins and is especially excellent in thermal shock resistance.

The upper limit of the softening point of the epoxy resin is not particularly limited; however, it is preferably 110° C. or lower in respect of handleability. In the case of using a cresol novolac epoxy resin as the epoxy resin, the softening point thereof is preferably 103° C. or lower, more preferably 102.5° C. or lower, and even more preferably 102° C. or lower, whereby the curable resin having good developability is easily obtained.

In the present invention, it is preferred that a cresol novolac epoxy resin having a softening point of 93° C. or higher is used as a main component of the epoxy resin. More preferably, a cresol novolac epoxy resin having a softening point of 93° C. or higher is used in the ratio of 80 mass % or more in 100 mass % of the total epoxy resin, even more preferably 90 mass % or more, further even more preferably 95 mass % or more, and it is particularly preferable that substantially only a cresol novolac epoxy resin having a softening point of 93° C. or higher is used as the epoxy resin.

As a cresol novolac epoxy resin having a softening point of 93° C. or higher, a cresol novolac epoxy resin N-695 available from DIC Corporation, a cresol novolac epoxy resin YDCN-704A available from Nippon Steel & Sumikin Chemical Co., Ltd and the others may be used. The softening point of the epoxy resin can be determined in accordance with JIS K 7234 (1986).

The phenol compound having an alcoholic hydroxyl group has a structure in which an alcoholic hydroxyl group are indirectly coupled with a phenol compound, and has an alcoholic hydroxyl group and a phenolic hydroxyl group. These two kinds of hydroxyl groups have different reactivity with the epoxy group of the epoxy resin from each other, and the phenolic hydroxyl group preferentially reacts with the epoxy group. Therefore, by reacting the phenol compound having an alcoholic hydroxyl group with the epoxy resin, an alcoholic hydroxyl group is able to be introduced into the curable resin via phenoxy group. The phenol compound may have a plurality of alcoholic hydroxyl groups or a plurality of phenolic hydroxyl groups, and further may have an another substituent group. The phenol compound having an alcoholic hydroxyl group includes naphthol having an alcoholic hydroxyl group and the like.

Examples of the phenol compound having an alcoholic hydroxyl group include, for example: hydroxyalkyl phenol such as p-hydroxyphenyl-2-ethanol, p-hydroxyphenyl-3-propanol, p-hydroxyphenyl-4-butanol, (bis)hydroxymethyl phenol and hydroxymethyl-di-t-butylphenol; hydroxyalkyl cresol such as hydroxyethyl cresol and (bis)hydroxymethyl cresol; an esterified product of carboxyl group-containing phenol compounds such as hydroxybenzoic acid, hydroxyphenylbenzoic acid and hydroxyphenoxybenzoic acid, with ethylene glycol, propylene glycol, glycerol or the like; a monoethylene oxide addition product of bisphenol; a monopropylene oxide addition product of bisphenol; and the like. These phenol compounds may be used alone or as a combination of two or more of them. Among them, hydroxyalkyl phenol or hydroxyalkyl cresol is preferably used, and hydroxyalkyl phenol is more preferably.

The unsaturated monobasic acid is a compound having one acid group and one or more radically polymerizable unsaturated bond, and carboxyl group is preferred as the acid group. By reacting the unsaturated monobasic acid with the epoxy resin, the acid group react with the epoxy group of the epoxy resin, thereby introducing a radically polymerizable double bond into the epoxy resin.

Examples of the unsaturated monobasic acid include, for example: acrylic acid, methacrylic acid, crotonic acid, cinnamic acid, β-acryloxypropionic acid, a reaction product of hydroxyalkyl (meth)acrylate having one hydroxyl group and one (meth)acryloyl group with dibasic anhydride, a reaction product of polyfunctional (meth)acrylate having one hydroxyl group and two or more (meth)acryloyl groups with dibasic anhydride, caprolactone modified products of these monobasic acids; and the like. These unsaturated monobasic acids may be used alone or as a combination of two or more of them. Among them, alkenyl carboxylic acid is preferably used, and acrylic acid or methacrylic acid is more preferably.

There are the following methods for reacting the epoxy resin with the phenol compound having an alcoholic hydroxyl group and the unsaturated monobasic acid: 1) the epoxy resin and the unsaturated monobasic acid are reacted with each other, and then, the resultant is reacted with the phenol compound having an alcoholic hydroxyl group; 2) the epoxy resin is reacted with the unsaturated monobasic acid and the phenol compound having an alcoholic hydroxyl group simultaneously; and 3) the epoxy resin and the phenol compound having an alcoholic hydroxyl group are reacted with each other, and then, the resultant is reacted with the unsaturated monobasic acid, and any of them may be employed.

In reacting the epoxy resin with the phenol compound having an alcoholic hydroxyl group and the unsaturated monobasic acid, it is preferred that 0.15 moles or more, more preferably 0.2 moles or more, even more preferably 0.25 moles or more, and preferably 0.5 moles or less, more preferably 0.45 moles or less, even more preferably 0.4 moles or less of the phenol compound having an alcoholic hydroxyl group is reacted with 1 chemical equivalent (molar equivalent) of the epoxy group of the epoxy resin. When 0.15 moles or more of the phenol compound is reacted with 1 chemical equivalent of the epoxy group of the epoxy resin, flexibility of the resulting cured product can be increased. When 0.5 moles or less of the phenol compound is reacted with 1 chemical equivalent of the epoxy group of the epoxy resin, the curable resin tends to have good curability.

It is preferred that 0.5 moles or more, more preferably 0.55 moles or more, even more preferably 0.6 moles or more, and preferably 0.85 moles or less, more preferably 0.8 moles or less, even more preferably 0.75 moles or less of the unsaturated monobasic acid is reacted with 1 chemical equivalent (molar equivalent) of the epoxy group of the epoxy resin. When 0.5 moles or more of the unsaturated monobasic acid is reacted with 1 chemical equivalent of the epoxy group of the epoxy resin, the curable resin tends to have good curability. When 0.85 moles or less of the unsaturated monobasic acid is reacted with 1 chemical equivalent of the epoxy group of the epoxy resin, brittleness of the resulting cured product can be reduced.

It is preferred that 0.8 moles or more, more preferably 0.85 moles or more, and preferably 1.1 moles or less, more preferably 1.05 moles or less of the phenol compound and the unsaturated monobasic acid in total is reacted with 1 chemical equivalent (molar equivalent) of the epoxy group of the epoxy resin. When 0.8 moles or more of the phenol compound and the unsaturated monobasic acid in total is reacted with 1 chemical equivalent of the epoxy group of the epoxy resin, the effect of introducing the phenol compound and the unsaturated monobasic acid into the epoxy resin tends to be sufficiently exerted. When 1.1 moles or less of the phenol compound and the unsaturated monobasic acid in total is reacted with 1 chemical equivalent of the epoxy group of the epoxy resin, less amount of the phenol compound and the unsaturated monobasic acid remains unreacted, preservation stability of the curable resin is improved, and deterioration of characteristics of the cured product due to these low-molecular weight compounds is suppressed.

As described above, the epoxy resin may be reacted with either one of the phenol compound or the unsaturated monobasic acid first, and then with the rest, or alternatively, may be reacted with the phenol compound and the unsaturated monobasic acid simultaneously. These reactions are conducted normally at temperature of 80° C. to 130° C. in the presence or absence of a diluent such as a radically polymerizable compound or a solvent, which will be described later, in the coexistence with a polymerization inhibitor such as hydroquinone and oxygen, and a reaction catalyst including tertially amine such as triethylamine, quarternary ammonium salt such as triethylbenzylammonium chloride, imidazole compounds such as 2-ethyl-4-methyl imidazole, phosphorous compounds such as triphenylphosphine, metal salts of organic acid or inorganic acid (e.g. lithium chloride), chelate compounds, and the like, thereby obtaining the reaction product (the modified epoxy resin intermediate).

In the modified epoxy resin intermediate, there exists a hydroxyl group derived from the phenol compound having an alcoholic hydroxyl group and a hydroxyl group formed by ring-opening of the epoxy group that is caused by reaction of the phenol compound and the unsaturated monobasic acid with the epoxy group of the epoxy resin.

When the polybasic anhydride is reacted with the modified epoxy resin intermediate, the polybasic anhydride reacts with the hydroxyl group of the modified epoxy resin intermediate, thereby obtaining the curable resin which a carboxyl group is introduced in. The obtained carboxyl group-containing curable resin has an alkaline developability, and therefore, it can be used as an alkaline developable curable resin for image formation or the like.

In the curable resin obtained as described above, the polybasic anhydride is considered to react with the hydroxyl group derived from the phenol compound preferentially, since steric hindrance of the hydroxyl group derived from the phenol compound is smaller than that of the hydroxyl group formed by ring-opening of the epoxy group. As a result, the double bond which was introduced by the reaction with the unsaturated monobasic acid and the carboxyl group which was introduced by the reaction with the polybasic anhydride are placed far away from each other sufficiently, and the function of the each functional group is likely to be effectively exhibited. Therefore, the curable resin becomes excellent in radical polymerizablity and alkali developability, and brittleness of the cured product is also reduced.

Examples of the polybasic anhydride include: dibasic anhydrides such as phthalic anhydride, succinic anhydride, octenylsuccinic anhydride, pentadodecenylsuccinic anhydride, maleic anhydride, tetrahydrophthalic anhydride, hexahydrophthalic anhydride, methyltetrahydrophthalic anhydride, 3,6-endomethylenetetrahydrophthalic anhydride, methylendomethylenetetrahydrophthalic anhydride, tetrabromophthalic anhydride and trimellitic anhydride; aliphatic or aromatic tetrabasic dianhydrides such as biphenyltetracarboxylic dianhydride, diphenyl ether tetracarboxylic dianhydride, butanetetracarboxylic dianhydride, cyclopentanetetracarboxylic dianhydride, pyromellitic dianhydride and benzophenonetetracarboxylic dianhydride; and the like. These polybasic anhydrides may be used alone or as a combination of two or more of them. Among them, dibasic anhydrides are preferably used.

It is preferred that 0.1 moles or more, more preferably 0.2 moles or more, and 1.1 moles or less, more preferably 0.9 moles or less of the anhydride group of the polybasic anhydride is reacted with 1 chemical equivalent (molar equivalent) of the hydroxyl group of the modified epoxy resin intermediate. By reacting the polybasic anhydride in this manner, the carboxyl group can be properly introduced into the curable resin and the reaction of the polybasic anhydride with the modified epoxy resin intermediate can be conducted efficiently.

The reaction between the modified epoxy resin intermediate and the polybasic anhydride is conducted usually at temperature of 50° C. to 130° C. in the presence or absence of a diluent such as a radically polymerizable compound or a solvent, which will be described later, in the coexistence with a polymerization inhibitor such as hydroquinone and oxygen. If necessary, there may be further added a catalyst including tertially amines such as triethylamine, quarternary ammonium salts such as triethylbenzylammonium chloride, metal salts such as lithium chloride, and the like. It is convenient that the reaction between the modified epoxy resin intermediate and the polybasic anhydride is conducted by adding the polybasic anhydride to the reaction solution following the production reaction of the modified epoxy resin intermediate.

It is preferred that the reaction product obtained by reacting between the modified epoxy resin intermediate and the polybasic anhydride is filtered. Thus, in the present invention, after obtaining a crude product by reacting the polybasic anhydride with the modified epoxy resin intermediate, it is preferred that the step of filtering the crude product (a filtering step) is conducted. By filtering, insoluble matters (contaminants) contained in the crude product can be removed, and the thus obtained curable resin realizes excellent pattern with high accuracy in the application of image forming.

Filtering may be conducted by using a conventionally-known filter such as a bag filter, a cartridge filter, a stainless steel wire mesh and the like, and it is preferred to use a filter having a resistance to a use solvent or acid. Filtering may be conducted under ordinary pressure, or may be conducted by applying pressure on a primary side (an inlet side) of the filter, or may be conducted by suctioning a secondary side (an outlet side) of the filter; and thus, a conventionally-known filtering method can be adopted. Pore size (opening size) of the filter is preferably 100 μm or smaller, more preferably 50 μm or smaller in view of enhancing filtration performance, and preferably 0.1 μm or larger, more preferably 1 μm or larger in view of ensuring filtration velocity (productivity). Filtration temperature is preferably 20° C. or higher, more preferably 30° C. or higher, and preferably 100° C. or lower, more preferably 95° C. or lower in consideration of working environment, safety and productivity.

The curable resin of the present invention preferably has acid value of 30 mgKOH/g or more, more preferably 40 mgKOH/g or more, even more preferably 50 mgKOH/g or more, and preferably 120 mgKOH/g or less, more preferably 110 mgKOH/g or less, even more preferably 100 mgKOH/g or less. When the curable resin has the acid value of 30 mgKOH/g or more, it tends to exhibit good alkaline developability even in a weak alkaline aqueous solution. When the curable resin has the acid value of 120 mgKOH/g or less, an exposed portion is less likely to be eroded by an alkaline developer and water resistance or moisture resistance of the cured product is enhanced.

The curable resin preferably has double bond equivalent (molecular weight per one chemical equivalent of radically polymerizable double bond) of 480 g/eq. or more, more preferably 490 g/eq. or more, even more preferably 500 g/eq. or more, and preferably 620 g/eq. or less, more preferably 610 g/eq. or less, and even more preferably 600 g/eq. or less. By controlling the double bond equivalent of the curable resin together with the the softening point of the epoxy resin, properties of the resulting cured product is widened. When the curable resin has double bond equivalent of 480 g/eq. or more, curability of the curable resin is improved and thermal properties of the cured product is improved. When the curable resin has double bond equivalent of 620 g/eq. or less, flexibility of the cured product is increased. The double bond equivalent is determined by dividing the total mass of the curable resin by moles of radically polymerizable double bonds introduced in the curable resin.

As described above, since the curable resin of the present invention is formed such that a radically polymerizable double bond and a carboxyl group are introduced in the epoxy resin, it has an alkaline developability and thermal or light curable property. On this occasion, since the epoxy resin is reacted with the phenol compound having an alcoholic hydroxyl group prior to the reaction with the polybasic anhydride, the double bond and the carboxyl group are placed far away from each other sufficiently, and the function of the each functional group is likely to be effectively exhibited. And further, by employing an epoxy resin having a softening point of 93° C. or higher is used as the epoxy resin, the resulting cured product is less likely to be cracked even when it is given a repeated heat history of high and low temperatures, and so, it is excellent in thermal cycle test resistance (TCT resistance), that is thermal shock resistance.

Next, a curable resin composition is explained. A curable resin composition of the present invention comprises the curable resin described above and a polymerization initiator. The curable resin composition of the present invention can be obtained by a producing process comprising the steps of: obtaining the curable resin according to the process for producing the curable resin of the present invention; and blending a polymerization initiator with the curable resin (a blending step).

When the curable resin composition is heated or exposed to light, the curable resin is cured to form a cured product. The curable resin of the present invention can be cured by using a conventionally-known thermal polymerization initiator, however, it is preferred to be photo-cured by adding a photo-polymerization initiator in view of enabling fine-processing or image-forming of the cured product by photolithography. In this respect, a photo-polymerization initiator is preferably used as the polymerization initiator.

As a thermal polymerization initiator, a conventionally-known one can be used, and examples thereof include: organic peroxides such as methyl ethyl ketone peroxide, benzoylperoxide, dicumylperoxide, t-butylhydroperoxide, cumenehydroperoxide, t-butylperoxyoctoate, t-butylperoxybenzoate and lauroyl peroxide; and azo-compounds such as azobisisobutyronitrile. The thermal polymerization initiator may be added together with a curing accelerator into the resin composition, and typical examples of the curing accelerator include cobalt naphthenate, cobalt octylate and tertiary amines. The amount of the thermal polymerization initiator is preferably 0.05 to 5 mass parts with respect to 100 mass parts of the total amount of the curable resin and a radically polymerizable compound which may be used as need.

As a photo-polymerization initiator, a conventionally-known one can be used, and examples thereof include: benzoins and alkyl ethers thereof such as benzoin, benzoin methyl ether and benzoin ethyl ether; acetophenones such as acetophenone, 2,2-dimethoxy-2-phenylacetophenone, 1,1-dichloroacetophenone and 4-(1-t-butyldioxy-1-methylethyl) acetophenone; anthraquinones such as 2-methylanthraquinone, 2-amylanthraquinone, 2-t-buthylanthraquinone and 1-chloroanthraquinone; thioxanthones such as 2,4-dimethylthioxanthone, 2,4-diisopropylthioxanthone and 2-chlorothioxanthone; ketals such as acetophenonedimethyl ketal and benzyldimethyl ketal; benzophenones such as benzophenone, 4-(1-t-butyldioxy-1-methylethyl) benzophenone and 3,3',4,4'-tetrakis (t-butyldioxycarbonyl) benzophenone; 2-methyl-1-[4-(methylthio) phenyl]-2-morpholino-propane-1-one and 2-benzyl-2-dimethylamino-1-(4-morpholinophenyl)-butanone-1; acylphosphine oxides and xanthones; and the like.

These photo-polymerization initiators may be used alone or as a combination of two or more of them, and the amount of the photo-polymerization inhibitor is preferably 0.5 to 30 mass parts with respect to 100 mass parts of the total amount of the curable resin and a radically polymerizable compound which may be used as need. When the amount of the photo-polymerization initiator is smaller than 0.5 mass parts, long photo irradiation is required, or the polymerization is hard to start by irradiation with light, and as a result, suitable surface hardness cannot be attained. On the other hand, there is no merit of using the photo-polymerization initiator in the amount exceeding 30 mass parts.

The curable resin composition may further comprises a radically polymerizable compound. Therefore, in the blending step, a radically polymerizable compound may be further blended with the curable resin and a polymerization initiator. The radically polymerizable compound may have only one radically polymerizable double bond or two or more of radically polymerizable double bonds. The radically polymerizable compound is involved in photo-polymerization, and can improve properties of the resulting cured product or adjust viscosity of the curable resin composition. In the case of using the radically polymerizable compound, the preferable amount thereof is 5 mass parts or more, more preferably 10 mass parts or more, and 500 mass parts or less, more preferably 100 mass parts or less with respect to 100 mass parts of the curable resin.

Examples of the radically polymerizable compound include radically polymerizable oligomers and radically polymerizable monomers. As the radically polymerizable oligomer, unsaturated polyester, epoxy acrylate, urethane acrylate, polyester acrylate and the like can be used, for example; and as the radically polymerizable monomer, aromatic vinyl monomers such as styrene, α-methylstyrene, α-chlorostyrene, vinyl toluene, divinylbenzene, diallylphthalate and diallylbenzenephosphonate; vinyl ester monomers such as vinyl acetate and vinyl adipate; (meth)acrylate monomers such as methyl (meth)acrylate, ethyl (meth)acrylate, butyl (meth)acrylate, β-hydroxyethyl (meth)acrylate, (2-oxo-1,3-dioxolane-4-yl)-methyl (meth)acrylate, (di)ethyleneglycol di(meth)acrylate, propyleneglycol di(meth) acrylate, trimethylolpropane di(meth)acrylate, trimethylolpropane tri(meth)acrylate, pentaerythritol tetra(meth) acrylate, dipentaerythritol hexa(meth)acrylate and tris (hydroxyethyl) isocianurate tri(meth)acrylate; triallyl cyanurate; and the like can be used. The radically polymerizable compound is selected from these compounds in accordance with the application and required characteristics of the curable resin, and may be used alone or as a combination of two or more of them.

The curable resin composition may comprise a solvent. Therefore, in the blending step, a solvent may be further blended with the curable resin and a polymerization initiator. Examples of the solvent include: hydrocarbons such as toluene and xylene; cellosolves such as butylcellosolve; carbitols such as carbitol and butylcarbitol; esters such as cellosolve acetate, carbitol acetate, (di)propylene glycol monomethyl ether acetate, (di)methyl glutarate, (di)methyl succinate and (di)methyl adipate; ketones such as methyl isobutyl ketone and methyl ethyl ketone; ethers such as diethylene glycol dimethyl ether; and the like. These solvents may be used alone or as a combination of two or more of them, and the use amount of the solvent is adjusted so that the curable resin composition has an optimum viscosity in use.

The curable resin composition may further comprise a conventionally-known additive such as a filler (e.g. talc, clay, barium sulfate and silica), a color pigment, a defoaming agent, a coupling agent, a leveling agent, a sensitizer, a mold release agent, a lubricant, a plasticizer, an antioxidant, an ultraviolet absorbing agent, a flame retardant, a polymerization inhibitor and a thickening agent, if needed.

The present invention also includes a cured product obtained by curing the curable resin or the curable resin composition. The cured product of the present invention can be obtained by a producing process comprising the steps of: obtaining the curable resin composition according to the process for producing the curable resin composition of the present invention; and curing the curable resin composition (a curing step). In the curing step, the curable resin composition is heated or exposed to light, whereby the curable resin composition or the curable resin contained therein is cured.

Alkaline development by using the curable resin of the present invention can be performed as follows: the curable resin is applied onto a substrate and exposed to light to obtain a coating layer of the cured product, and then an unexposed portion is dissolved in an alkaline solution. Examples of the usable alkali include: alkali metal compounds such as sodium carbonate, potassium carbonate, sodium hydroxide and potassium hydroxide; alkali earth metal compounds such as calcium hydroxide; ammonia; and water soluble organic amines such as monomethylamine, dimethylamine, trimethylamine, monoethylamine, diethylamine, triethylamine, monopropylamine, dimethylpropylamine, monoethanolamine, diethanolamine, triethanolamine, ethylenediamine, diethylenetriamine, dimethylaminoethylmethacrylate and polyethyleneimine, and these may be used alone or as a combination of two or more of them.

The curable resin or the curable resin composition of the present invention may be directly applied to a substrate in a liquid form, or otherwise may be applied to a film such as polyethylene terephthalate, preliminary, and dried, thereby using as a dry film. In the latter case, the dry film may be laminated on a substrate and the film may be peeled off before or after exposure. In addition, the cured product can be obtained by the method of scanning with a laser beam on the coating layer directly using a digitized data to expose to conduct drawing.

Since the cured product of the present invention is obtained by curing the modified epoxy resin formed from the epoxy resin having a softening point of 93° C. or higher, it is less likely to be cracked even when it is given a repeated heat history of high and low temperatures, and so, it is excellent in thermal shock resistance.

EXAMPLES

The present invention is hereinafter described more specifically by reference to Examples; however, the scope of the present invention is not limited to these Examples. In the following description, the terms "part" and "%" mean "part by mass" and "% by mass", respectively, unless otherwise noted.

(1) Synthesis of Curable Resins
(1-1) Synthetic Example 1

212 parts of a cresol novolac epoxy resin having a softening point of 94° C. and epoxy equivalent of 212 g/eq. (N-695 available from DIC Corporation) was dissolved in 200 parts of ethylcarbitol acetate, and 1.5 parts of triphenylphosphine as a reaction catalyst, 0.3 parts of methyl hydroquinone as a polymerization inhibitor, 41 parts of p-hydroxyphenyl-2-ethanol as the phenol compound having an alcoholic hydroxyl group and 51 parts of acrylic acid as the unsaturated monobasic acid were added thereto and reacted for 15 hours at 110° C. Then, 68 parts of tetrahydrophthalic anhydride as the polybasic acid anhydride was added thereto and reacted for 5 hours at 100° C. The obtained reaction liquid was cooled to 90° C. and filtered through a 300-mesh woven wire (opening size is about 50 μm) made of stainless steel. As a result, an ethylcarbitol acetate solution containing 65% of a curable resin (A-1), which had an acid value of 70 mgKOH/g and double bond equivalent of 530 g/eq., was obtained.

(1-2) Synthetic Example 2

210 parts of a cresol novolac epoxy resin having a softening point of 96° C. and epoxy equivalent of 210 g/eq. (YDCN-704A available from Nippon Steel & Sumikin Chemical Co., Ltd) was dissolved in 198 parts of ethylcarbitol acetate, and 1.5 parts of triphenylphosphine as a reaction catalyst, 0.3 parts of methyl hydroquinone as a polymerization inhibitor, 41 parts of p-hydroxyphenyl-2-ethanol as the phenol compound having an alcoholic hydroxyl group and 51 parts of acrylic acid as the unsaturated monobasic acid were added thereto and reacted for 15 hours at 110° C. Then, 65 parts of tetrahydrophthalic anhydride as the polybasic acid anhydride was added thereto and reacted for 5 hours at 100° C. The obtained reaction liquid was cooled to 90° C. and filtered through a 300-mesh woven wire (opening size is about 50 μm) made of stainless steel. As a result, an ethylcarbitol acetate solution containing 65% of a curable resin (A-2), which had acid value of 69 mgKOH/g and double bond equivalent of 520 g/eq., was obtained.

(1-3) Synthetic Example 3

210 parts of the cresol novolac epoxy resin used in the Synthetic Example 2 was dissolved in 201 parts of ethylcarbitol acetate, and 1.5 parts of triphenylphosphine as a reaction catalyst, 0.3 parts of methyl hydroquinone as a polymerization inhibitor, 48 parts of p-hydroxyphenyl-2-ethanol as the phenol compound having an alcoholic hydroxyl group and 48 parts of acrylic acid as the unsaturated monobasic acid were added thereto and reacted for 15 hours at 110° C. Then, 68 parts of tetrahydrophthalic anhydride as the polybasic acid anhydride was added thereto and reacted for 5 hours at 100° C. The obtained reaction liquid was cooled to 90° C. and filtered through a 300-mesh woven wire (opening size is about 50 μm) made of stainless steel. As a result, an ethylcarbitol acetate solution containing 65% of a curable resin (A-3), which had acid value of 70 mgKOH/g and double bond equivalent of 570 g/eq., was obtained.

(1-4) Synthetic Example 4

106 parts of the cresol novolac epoxy resin (N-695 available from DIC Corporation) used in the Synthetic Example 1 and 105 parts of the cresol novolac epoxy resin (YDCN-704A available from Nippon Steel & Sumikin Chemical Co., Ltd) used in the Synthetic Example 2 were dissolved in 200 parts of ethylcarbitol acetate, and 1.5 parts of triphenylphosphine as a reaction catalyst, 0.3 parts of methyl hydroquinone as a polymerization inhibitor, 41 parts of p-hydroxyphenyl-2-ethanol as the phenol compound having an alcoholic hydroxyl group and 51 parts of acrylic acid as the unsaturated monobasic acid were added thereto and reacted for 15 hours at 110° C. Then, 68 parts of tetrahydrophthalic anhydride as the polybasic acid anhydride was added thereto and reacted for 5 hours at 100° C. The obtained reaction liquid was cooled to 90° C. and filtered through a 300-mesh woven wire (opening size is about 50 μm) made of stainless steel. As a result, an ethylcarbitol acetate solution containing 65% of a curable resin (A-4), which had acid value of 71 mgKOH/g and double bond equivalent of 530 g/eq., was obtained.

(1-5) Comparative Synthetic Example 1

219 parts of a cresol novolac epoxy resin having a softening point of 90° C. and epoxy equivalent of 219 g/eq. (ESCN-220HH available from Sumitomo Chemical Co., Ltd) was dissolved in 204 parts of ethylcarbitol acetate, and 1.5 parts of triphenylphosphine as a reaction catalyst, 0.3 parts of methyl hydroquinone as a polymerization inhibitor, 41 parts of p-hydroxyphenyl-2-ethanol as the phenol compound having an alcoholic hydroxyl group and 51 parts of acrylic acid as the unsaturated monobasic acid were added thereto and reacted for 15 hours at 110° C. Then, 68 parts of tetrahydrophthalic anhydride as the polybasic acid anhydride was added thereto and reacted for 5 hours at 100° C. The obtained reaction liquid was cooled to 90° C. and filtered through a 300-mesh woven wire (opening size is about 50 µm) made of stainless steel. As a result, an ethylcarbitol acetate solution containing 65% of a curable resin (B-1), which had acid value of 69 mgKOH/g and double bond equivalent of 540 g/eq., was obtained.

(1-6) Comparative Synthetic Example 2

219 parts of the cresol novolac epoxy resin used in the Comparative Synthetic Example 1 was dissolved in 203 parts of ethylcarbitol acetate, and 1.5 parts of triphenylphosphine as a reaction catalyst, 0.3 parts of methyl hydroquinone as a polymerization inhibitor, 30 parts of p-hydroxyphenyl-2-ethanol as the phenol compound having an alcoholic hydroxyl group and 57 parts of acrylic acid as the unsaturated monobasic acid were added thereto and reacted for 15 hours at 110° C. Then, 68 parts of tetrahydrophthalic anhydride as the polybasic acid anhydride was added thereto and reacted for 5 hours at 100° C. The obtained reaction liquid was cooled to 90° C. and filtered through a 300-mesh woven wire (opening size is about 50 µm) made of stainless steel. As a result, an ethylcarbitol acetate solution containing 65% of a curable resin (B-2), which had acid value of 70 mgKOH/g and double bond equivalent of 480 g/eq., was obtained.

(2) Preparation of Curable Resin Compositions and Evaluation Methods thereof (2-1) Preparation Method Curable resin compositions were prepared according to the blending ratio shown in Table 1, using the curable resin solutions obtained in the Synthetic Examples 1 to 4 and Comparative Synthetic Examples 1 and 2, to be named as Examples 1 to 4 and Comparative Examples 1 and 2, respectively, and were evaluated by the following methods.

(2-2) Tack-free Property 1

Each curable resin composition was applied in a thickness of 20 µm to 30 µm onto a copper plate of 0.5 mm thickness and dried for 30 minutes at 80° C. in a hot air-circulating type heating oven, thereby forming a coating layer. The coating layer was touched with a finger to evaluate a tack-free property based on the following criteria.

A: None tacky
B: Slightly tacky
C: Very tacky (2-3) Tack-free Property 2

A dried coating layer was prepared in the same manner as the evaluation of the tack-free property 1. Then a negative film was compressed onto the coating layer and exposed to light with the intensity of 2 J/cm$^2$ using an ultraviolet exposure apparatus. After the exposure, condition of peeling off the negative film was evaluated based on the following criteria A: Peeled off without peeling sound
B: Peeling sound was made
C: Coating layer was adhered to the negative film (2-4) Developability Each curable resin composition was applied in a thickness of 20 µm to 30 µm onto a copper plate of 0.5 mm thickness and dried for 30 minutes at 80° C. in a hot air-circulating type heating oven, thereby forming a coating layer. Then a negative film was compressed onto the coating layer and exposed to light with the intensity of 2 J/cm$^2$ using an ultraviolet exposure apparatus. The negative film was peeled off and development was conducted using 1% $Na_2CO_3$ aqueous solution at 30° C. for 80 seconds, and presence of remaining resin coating layer was visually evaluated based on the following criteria.

A: Good developability (No deposit in the unexposed portion)
B: Bad developability (Deposits remained in the unexposed portion)

(2-5) Glass-transition Temperature

Each curable resin composition was applied onto a polyethylene terephthalate film so that the thickness of the layer after drying was about 100 µm, and dried for 30 minutes at 80° C. to obtain a coating layer. Exposure of the coating layer was conducted with the intensity of 2 J/cm$^2$ using an ultraviolet exposure apparatus, and then heated for 1 hour at 150° C. The resultant was cooled to room temperature, and the cured coating layer was peeled from the polyethylene terephtalate film to obtain a test piece. Glass-transition temperature of the test piece was measured by a thermal analyzer TMA in a tensile mode.

(2-6) Thermal Cycle Test Resistance (TCT Resistance)

The cured product was obtained by forming a dried coating layer, exposing and developing in the same manner as the evaluation of developability. The resultant was heated for 1 hour at 150° C. to obtain a test substrate. A thermal cycle test was conducted using this test substrate, where cycles of 15 minutes at −65° C. and 15 minutes at 150° C. were repeated and the appearance of the test substrate was observed in each 250 cycles to be visually evaluated based on the following criteria.

A: Crack was not observed even after 500 cycles
B: Crack was observed at a time of 500 cycles
C: Crack was observed at a time of 250 cycles (3) Results Evaluation results of the tests were shown in Table 1. In Examples 1 to 4 where cresol novolac type epoxy resins having a softening point of 94° C. or 96° C., the obtained cured products were excellent in the thermal cycle test resistance (TCT resistance) and were also excellent in the tack-free properties and developability. Meanwhile, in Comparative Examples 1 and 2 where cresol novolac type epoxy resins having a softening point of 90° C., the obtained cured products cracked during repeating 500 cycles or 250 cycles of the thermal cycle test and were inferior in the thermal cycle test resistance (TCT resistance).

TABLE 1

|  | Curable Resin Solution | | Monomer | Polymerization Initiator | | | | | |
|---|---|---|---|---|---|---|---|---|---|
|  | Resin Solution | Blending Ratio (Parts) | Blending Ratio (Parts) | Blending Ratio (Parts) | Tack-free Property 1 | Tack-free Property 2 | Developability | Grass-transition Temp. | TCT Resistance |
| Example 1 | A-1 | 154 | 10 | 5 | A | A | A | 119° C. | A |
| Example 2 | A-2 | 154 | 10 | 5 | A | A | A | 122° C. | A |

TABLE 1-continued

|  | Curable Resin Solution | | Monomer | Polymerization Initiator | | | | | |
|---|---|---|---|---|---|---|---|---|---|
|  | Resin Solution | Blending Ratio (Parts) | Blending Ratio (Parts) | Blending Ratio (Parts) | Tack-free Property 1 | Tack-free Property 2 | Developability | Grass-transition Temp. | TCT Resistance |
| Example 3 | A-3 | 154 | 10 | 5 | A | A | A | 118° C. | A |
| Example 4 | A-4 | 154 | 10 | 5 | A | A | A | 120° C. | A |
| Comparative Example 1 | B-1 | 154 | 10 | 5 | A | B | A | 108° C. | B |
| Comparative Example 2 | B-2 | 154 | 10 | 5 | A | B | A | 114° C. | C |

* Monomer (Radical polymerizable compound): dipentaerythritol hexaacrylate
Polymerization Initiator: Irgacure (Trade mark) 907 (a polymerization initiator available from BASF Japan Ltd.)

The curable resin and the curable resin composition of the present invention can be used for various applications such as, for example, a plate making for printing and a liquid crystal display panel production (e.g. a protection film for a color filter, a color filter and a black matrix), as an alkaline developable imaging applications.

The invention claimed is:

1. A curable resin obtained by reacting a polybasic anhydride with a reaction product of an epoxy resin with a phenol compound having an alcoholic hydroxyl group and an unsaturated monobasic acid, wherein
a cresol novolac epoxy resin having a softening point of 94° C. or higher and 103° C. or lower is used as the epoxy resin,
wherein a hydroxyalkyl phenol or a hydroxyalkyl cresol is used as the phenol compound,
wherein an alkenyl carboxylic acid is used as the unsaturated monobasic acid,
wherein a dibasic anhydride is used as the polybasic anhydride,
wherein the curable resin has a double bond equivalent of 480 g/eq. or more and 620 g/eq. or less, and
wherein the curable resin has an acid value of 30 mgKOH/g or more and 120 mgKOH/g or less.

2. The curable resin according to claim 1, wherein 0.15 moles or more and 0.5 moles or less of the phenol compound is reacted with 1 chemical equivalent of an epoxy group of the epoxy resin.

3. The curable resin according to claim 1, wherein 0.5 moles or more and 0.85 moles or less of the unsaturated monobasic acid is reacted with 1 chemical equivalent of an epoxy group of the epoxy resin.

4. The curable resin according to claim 1, wherein 0.8 moles or more and 1.1 moles or less of the phenol compound and the unsaturated monobasic acid in total is reacted with 1 chemical equivalent of an epoxy group of the epoxy resin.

5. The curable resin according to claim 1, wherein 0.1 moles or more and 1.1 moles or less of the polybasic anhydride is reacted with 1 chemical equivalent of a hydroxyl group of the reaction product.

6. A curable resin composition comprising the curable resin according to claim 1 and a polymerization initiator.

7. A cured product obtained by curing the curable resin composition according to claim 6.

8. A cured product obtained by curing the curable resin according to claim 1.

9. A process for producing a curable resin comprising the steps of:
reacting a cresol novolac epoxy resin having a softening point of 94° C. or higher and 103° C. or lower with a phenol compound having an alcoholic hydroxyl group and an unsaturated monobasic acid to give a modified epoxy resin intermediate; and
reacting a polybasic anhydride with a hydroxyl group of the modified epoxy resin intermediate,
wherein a hydroxyalkyl phenol or a hydroxyalkyl cresol is used as the phenol compound,
wherein an alkenyl carboxylic acid is used as the unsaturated monobasic acid,
wherein a dibasic anhydride is used as the polybasic anhydride,
wherein the curable resin has a double bond equivalent of 480 g/eq. or more and 620 g/eq. or less, and
wherein the curable resin has an acid value of 30 mgKOH/g ore more and 120 mgKOH/g or less.

10. The process for producing the curable resin according to claim 9, wherein 0.15 moles or more and 0.5 moles or less of the phenol compound is reacted with 1 chemical equivalent of an epoxy group of the epoxy resin.

11. The process for producing the curable resin according to claim 9, wherein 0.5 moles or more and 0.85 moles or less of the unsaturated monobasic acid is reacted with 1 chemical equivalent of an epoxy group of the epoxy resin.

12. The process for producing the curable resin according to claim 9, wherein 0.8 moles or more and 1.1 moles or less of the phenol compound and the unsaturated monobasic acid in total is reacted with 1 chemical equivalent of an epoxy group of the epoxy resin.

13. The process for producing the curable resin according to claim 9, wherein 0.1 moles or more and 1.1 moles or less of the polybasic anhydride is reacted with 1 chemical equivalent of the hydroxyl group of the reaction product.

* * * * *